United States Patent
Chang et al.

(10) Patent No.: US 11,973,522 B2
(45) Date of Patent: *Apr. 30, 2024

(54) FRONT END ARCHITECTURE FOR SELECTIVELY ADDING EXTERNAL CARRIER AGGREGATION BAND

(71) Applicant: SKYWORKS SOLUTIONS, INC., Irvine, CA (US)

(72) Inventors: Jen-Chien Chang, Irvine, CA (US); Reza Kasnavi, Solana Beach, CA (US); Roman Zbigniew Arkiszewski, Oak Ridge, NC (US); Jeffrey Gordon Strahler, Greensboro, NC (US); John G. Freed, Raleigh, NC (US)

(73) Assignee: Skyworks Solutions, Inc., Irvine, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/197,769

(22) Filed: Mar. 10, 2021

(65) Prior Publication Data

US 2021/0194511 A1    Jun. 24, 2021

Related U.S. Application Data

(63) Continuation of application No. 16/217,659, filed on Dec. 12, 2018, now Pat. No. 10,979,088.
(Continued)

(51) Int. Cl.
*H04B 7/26* (2006.01)
*H04B 1/00* (2006.01)
(Continued)

(52) U.S. Cl.
CPC ......... *H04B 1/0057* (2013.01); *H04B 7/2621* (2013.01); *H04L 5/14* (2013.01); *H04Q 11/02* (2013.01)

(58) Field of Classification Search
CPC .... H04B 1/0057; H04B 1/006; H04B 1/0064; H04B 7/2621; H04L 5/001; H04L 5/14; H04Q 11/02; H04W 72/0453
(Continued)

(56) References Cited

U.S. PATENT DOCUMENTS

| 8,774,068 B2 | 7/2014 | Bengtsson et al. |
| 10,979,088 B2 | 4/2021 | Chang et al. |

(Continued)

OTHER PUBLICATIONS

LTE Carrier Aggregation, E-UTRA CA configurations 36.101, released Sep. 15, 2018, available at: http://niviuk.free.fr/lte_ca_band.php (accessed Nov. 8, 2018).
(Continued)

*Primary Examiner* — Harun Chowdhury
(74) *Attorney, Agent, or Firm* — Knobbe, Martens, Olson & Bear, LLP

(57) ABSTRACT

Aspects of this disclosure relate to a front end architecture for selectively adding an external carrier aggregation band. A switch element can connect a radio frequency signal path to an antenna path through a frequency domain multiplexer, such as a diplexer, in a first mode. The switch element can connect the radio frequency path to the antenna path and bypass the frequency domain multiplexer in a second mode. The frequency domain multiplexer can be external to a front end module that include the radio frequency signal path. In the first mode, a front end system can support carrier aggregation with a band associated with circuitry implemented external to the front end module.

20 Claims, 12 Drawing Sheets

Related U.S. Application Data

(60) Provisional application No. 62/599,576, filed on Dec. 15, 2017.

(51) Int. Cl.
*H04L 5/14* (2006.01)
*H04Q 11/02* (2006.01)

(58) Field of Classification Search
USPC .......................... 370/277, 280, 297; 375/219
See application file for complete search history.

(56) References Cited

U.S. PATENT DOCUMENTS

| | | |
|---|---|---|
| 2010/0202325 A1 | 8/2010 | Poulin et al. |
| 2013/0039227 A1* | 2/2013 | Ji .......................... H04B 1/006 370/297 |
| 2014/0086109 A1 | 3/2014 | Bagger |
| 2016/0149690 A1* | 5/2016 | Khlat ...................... H04L 5/001 370/280 |
| 2017/0063404 A1 | 3/2017 | Langer et al. |
| 2017/0093442 A1 | 3/2017 | Jayaraman et al. |
| 2017/0237451 A1 | 8/2017 | Khlat |
| 2019/0044548 A1* | 2/2019 | Freisleben ........... H04B 1/0057 |
| 2019/0190548 A1 | 6/2019 | Chang et al. |

OTHER PUBLICATIONS

Skyworks Solutions, Inc., Product Summary, SKY13699-21: 0.4 to 6.0 GHz DPDT Low Insertion Loss/High-Isolation Switch, Oct. 8, 2018.
Skyworks Solutions, Inc., Product Summary, SKY13698-694LF: 0.4 to 5.9 GHz DPDT Low Insertion Loss/High-Isolation Switch, Apr. 11, 2017.

* cited by examiner

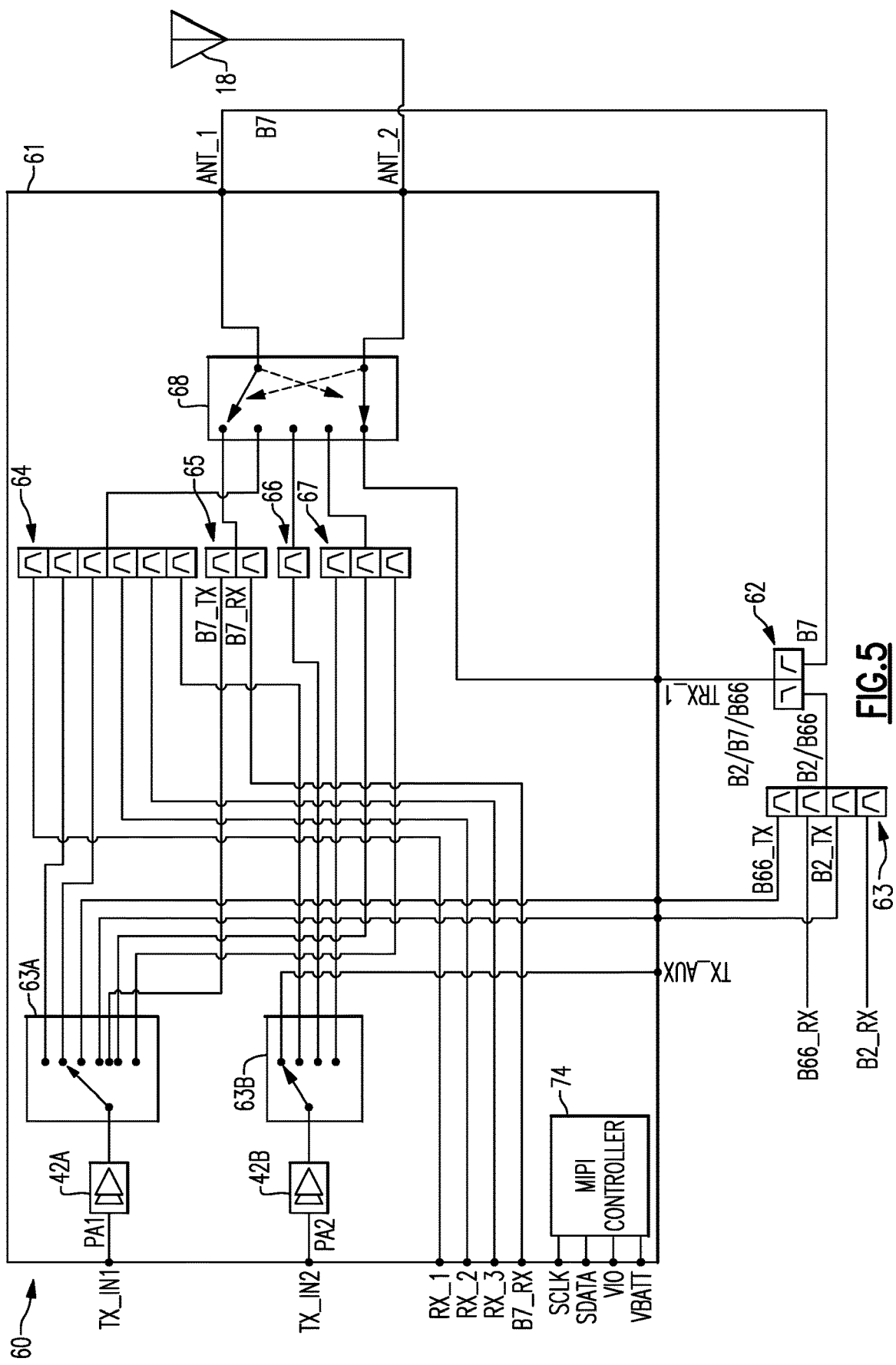

FRONT END ARCHITECTURE FOR SELECTIVELY ADDING EXTERNAL CARRIER AGGREGATION BAND

CROSS REFERENCE TO PRIORITY APPLICATIONS

This application is a continuation of U.S. patent application Ser. No. 16/217,659, filed Dec. 12, 2018 and titled "FRONT END ARCHITECTURE FOR SELECTIVELY ADDING EXTERNAL CARRIER AGGREGATION BAND," which claims the benefit of priority under 35 U.S.C. § 119(e) of U.S. Provisional Patent Application No. 62/599,576, filed Dec. 15, 2017 and titled "FRONT END ARCHITECTURE FOR SELECTIVELY ADDING EXTERNAL CARRIER AGGREGATION BAND," the disclosures of each of which are hereby incorporated by reference in their entireties herein.

BACKGROUND

Technical Field

This disclosure relates to radio frequency circuits and, in particular, to radio frequency front ends.

Description of Related Technology

The 3rd Generation Partnership Project (3GPP) specifications define frequency bands and carrier aggregation combinations. Several carrier aggregation combinations are relatively widely used for a variety of applications. A front end module, such as a power amplifier module that includes duplexers, can include circuitry to support one or more commonly used carrier aggregation combinations.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a radio frequency system that includes a radio frequency signal path, a frequency domain multiplexer, and a switch element configurable into at least a first mode and a second mode. The switch element is configured to connect the radio frequency signal path to an antenna path through the frequency domain multiplexer in the first mode. The switch element is configured to connect the radio frequency signal path to the antenna path so as to bypass the frequency domain multiplexer in the second mode.

The radio frequency system can include a second radio frequency signal path connected to the frequency domain multiplexer. The radio frequency system can support carrier aggregation of radio frequency signals associated with the first radio frequency signal path and the second path in the first mode.

The radio frequency system can include a receive filter connected to the frequency domain multiplexer. The switch element can connect the receive filter to the antenna path in the first mode and decouple the receive filter from the antenna path in the second mode.

The radio frequency system can include a duplexer connected to the frequency domain multiplexer. The switch element can connect the duplexer to the antenna path in the first mode and decouple the duplexer from the antenna path in the second mode.

The frequency domain multiplexer can be a diplexer. The switch element can be a double pole double throw radio frequency switch. The antenna path can include a second frequency domain multiplexer connected between the switch element and an antenna. The radio frequency signal path can be implemented on a power amplifier module that includes an antenna port connected to the switch element.

The radio frequency system can include a Band 32 receive filter connected to the frequency domain multiplexer. The radio frequency signal path can be a Band 3 signal path. The radio frequency system can support a Band 3/Band 32 carrier aggregation in the first mode.

Another aspect of this disclosure is a front end system that includes a power amplifier module including an antenna port, a diplexer external to the power amplifier module, and a switch element external to the power amplifier module. The switch element is configurable into at least a first mode and a second mode. The switch element is configured to connect the antenna port to an antenna path through the diplexer in the first mode. The switch element is configured to connect the antenna port to the antenna path so as to bypass the diplexer in the second mode.

The front end system can include a phone board, and the power amplifier module, the diplexer, and the switch element can be positioned on the phone board.

The front end system can include a receive filter connected to the diplexer. The switch element can connect the receive filter to the antenna path in the first mode and decouple the receive filter from the antenna path in the second mode.

The front end system can include a Band 32 receive filter connected to the diplexer. The power amplifier module can include a Band 3 signal path connectable to the antenna port. The diplexer can be configured to separate Band 3 and Band 32 signals.

The front end system can include a duplexer connected to the diplexer. The switch element can connect the duplexer to the antenna path in the first mode and decouple the duplexer from the antenna path in the second mode.

Another aspect of this disclosure is a method of connecting a radio frequency signal path to an antenna. The method includes connecting the radio frequency signal path to the antenna through a frequency domain multiplexer using a switch element, in which the radio frequency signal path is implemented on a radio frequency module, and in which the frequency domain multiplexer is external to the radio frequency module. The method also includes changing a state of the switch element such that the radio frequency signal path is connected to the antenna and bypasses the frequency domain multiplexer.

The connecting can support processing a carrier aggregation signal that includes a first carrier associated with the radio frequency signal path and a second carrier associated with a filter external to the radio frequency module that is connected to the frequency domain multiplexer.

The switch element can be external to the frequency module. The frequency domain multiplexer can be a diplexer.

Another aspect of this disclosure is a radio frequency system that includes a power amplifier module including an antenna port, a frequency domain multiplexer, an antenna path, and a switch element. The frequency domain multiplexer includes a common port, a low pass port, and a high pass port. The switch element includes a first port connected to the antenna port, a second port connected to the common port, a third port connected to either the low pass port or the high pass port, and a fourth port connected to the antenna path. The switch element is configured to connect the first port to the third port and connect the second port to the fourth port in a first mode. The switch element is configured to connect the first port to the fourth port in a second mode.

Another aspect of this disclosure is a wireless communication device that includes an antenna, a power amplifier module including an antenna port, a frequency domain multiplexer, and a switch element configurable into at least a first mode and a second mode. The switch element is configured to connect the antenna port to the antenna through the frequency domain multiplexer in the first mode. The switch element is configured to connect the antenna port to the antenna so as to bypass the frequency domain multiplexer in the second mode.

The wireless communication device can be a mobile phone.

Yet another aspect of this disclosure is a front end system that includes a power amplifier module, a filter external to the power amplifier module, and a frequency multiplexer external to the power amplifier module. The power amplifier module includes a first antenna port, a second antenna port, and a transmit/receive port. The power amplifier module also includes an antenna switch connected to the first antenna port, the second antenna port, and the transmit/receive port. The frequency multiplexer includes a first port connected to the filter, a second port connected to the second antenna port of the power amplifier module, and a common port connected to the transmit/receive port of the power amplifier module.

The antenna switch can be configured to connect a signal path of the power amplifier module to the first antenna port in a first state and to the second antenna port in a second state. The second state can be associated with carrier aggregation of a first band associated with the signal path and a second band associated with the filter external to the power amplifier.

One of the first port and the second port can be a high pass port and the other of the first port and the second port can be a low pass port. The frequency multiplexer can be a diplexer. The filter can be a receive filter. The filter can be included in a duplexer. The filter can be included in multiplexer that includes a plurality of filters coupled to a common node. The filter can be an acoustic wave filter.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIG. 5 is a schematic diagram of a radio frequency front end architecture for adding an external carrier aggregation band according to another embodiment.

DETAILED DESCRIPTION OF CERTAIN EMBODIMENTS

Figure 1A:
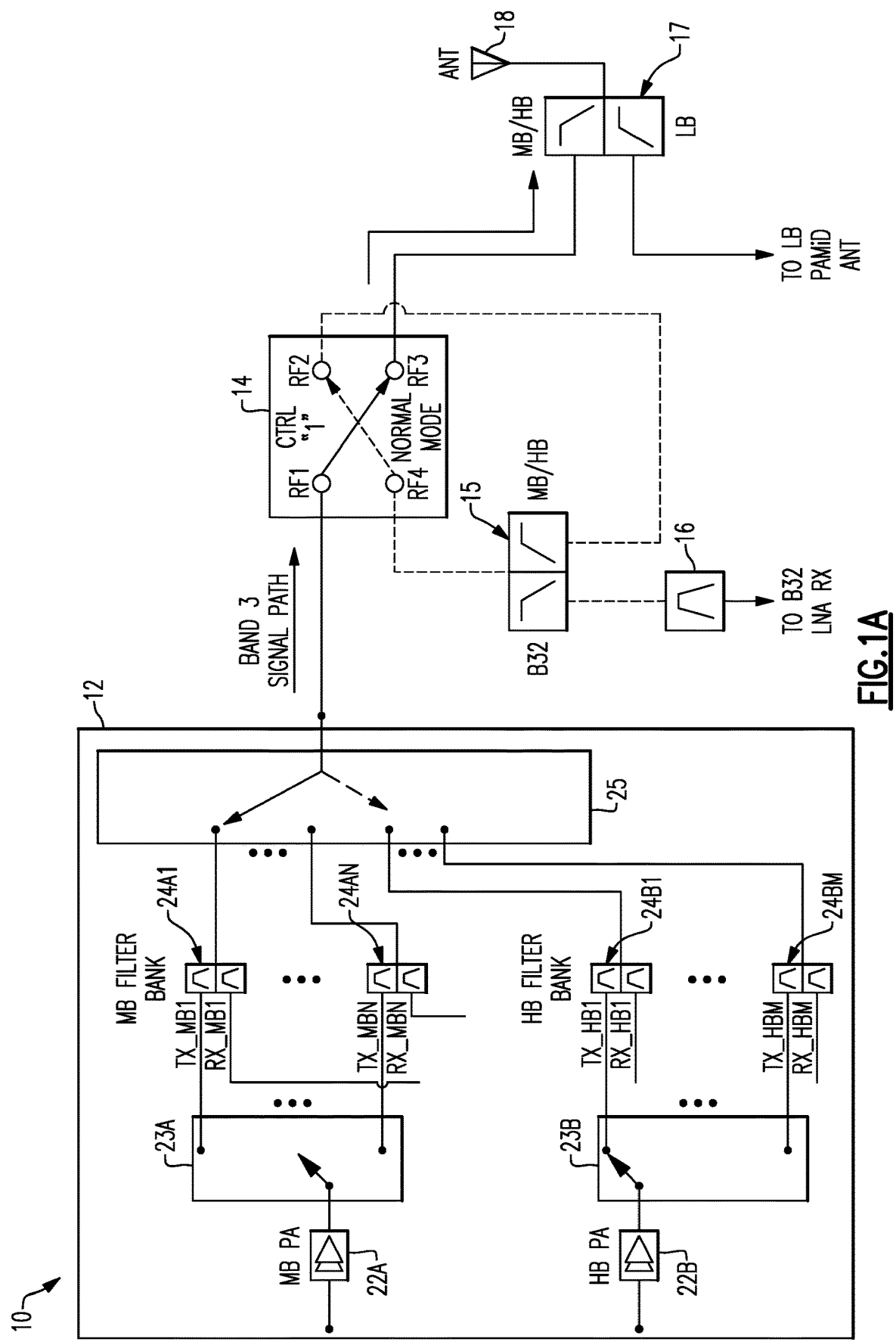
FIG. 1A is a schematic diagram of a radio frequency front end architecture according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A carrier can be a signal that is modulated with an input signal to transmit information. The carrier is typically at a significantly higher frequency than the input signal. The carrier can be a radio frequency signal. Carrier aggregation can provide relatively high peak data rates, increased data rates for users in a cell, and higher capacity for bursty applications.

A front end system can process signals being transmitted and/or received via one or more antennas. For example, a front end system can include one or more switches, one or more filters, one or more amplifiers, and/or other circuitry in signal paths between one or more antennas and a transceiver.

This disclosure provides a radio frequency (RF) front end architecture that allows one or more additional carrier aggregation (CA) frequency bands to be added to an existing CA solution. Carrier aggregation combines two or more frequency ranges in the same or different frequency bands. The aggregated spectrum allows transfer of more data per unit time than using only a single carrier.

Current carrier aggregation frequency bands and band combinations are defined by the 3rd Generation Partnership Project (3GPP). A current version of the 3GPP specification includes 59 frequency bands and 145 permitted CA combinations for two unique bands. A number of these pairings are relatively widely used across the cellular industry (for example, Band 1/Band3, Band 39/Band 41, etc.) and vendors have developed front end solutions incorporating power amplifiers, filters, antenna switch, and combining methods for the most common CA combinations. To reduce and/or optimize cost and space, front end components can be integrated into a power amplifier module including a duplexer (PAMiD).

In most current cases, cellular handset data usage is asymmetric; downlink (RX) data usage is typically much greater than uplink (TX) data usage. 3GPP has defined a number of bands for downlink only CA cases. These bands can be used in conjunction with a duplex (TX and RX) CA band to improve the downlink data throughput.

A problem arises when a customer desires to cover a CA band that is not integrated in an existing PAMiD design. This disclosure provides a front end architecture solution that allows one or more additional CA bands to be added to an existing CA solution with a relatively minimal impact to the existing PAMiD and product design time. Embodiments of the disclosed architecture include an RF switch and diplexer to allow an additional CA band to be covered. The RF switch and the diplexer can be external to the PAMiD. In some instances, RF switch functionality can be implemented by a switch of the PAMiD and the diplexer can be external to the PAMiD. Embodiments of the disclosed architecture also allow the additional CA RX band to be switched out of the signal path, lowering the overall insertion loss when the additional CA RX band is not being used.

Some previous solutions to cover additional CA bands have involved redesign of a PAMiD to integrate filtering for the additional CA band. Some issues with these previous solutions will now be discussed. First, redesign can involve significant engineering resources and the redesign schedule may not be compatible with the customer's desired product release schedule. Second, incorporating an extra band for one customer can result in a custom part specific to that customer. This can increase the cost of the part due to the lower sales potential compared to a standard part, as well as by the additional documentation created to support the custom part. Third, redesign may not be a straightforward matter of just integrating an additional filter. Most switches that connect the active signal path to the antenna do not have unused inputs because insertion loss is proportional to the number of switch arms, so a new switch design may be desired.

Front end architectures discussed herein include a low loss switch and a frequency domain multiplexer (e.g., a diplexer) to separate a main CA RF signal from an auxiliary CA RX signal. The switch can provide an on-demand frequency domain multiplexer between a radio frequency signal path and an antenna. The switch can have two inputs and two outputs and can be configured in a straight-through configuration (e.g., input 1 to output 1 and input 2 to output 2) or a cross-connected configuration (e.g., input 1 to output 2 and input 2 to output 1). It will be understood that transmit input ports can be receive output ports and transmit output ports and be receive input ports.

In the straight-through CA mode, the main CA RF signal can be routed through a first path of the switch (e.g., input 1 to output 1), then through one port of an auxiliary diplexer, then through a second path of the switch (e.g., input 2 to output 2), and then to an antenna either directly or through an antenna diplexer. The auxiliary CA RX signal passes from the antenna through the antenna diplexer (if used), then through the second path of the switch (e.g., output 2 to input 2) into the common port of the auxiliary diplexer which separates the auxiliary CA RX signal from the main CA RF signal. The auxiliary CA RX output from the diplexer can then be filtered by a band pass RX filter and passed on to the auxiliary RX.

In the cross-connected (non-CA) mode, the RF signal is routed from input 1 to output 2 of the switch then to the antenna while bypassing the auxiliary diplexer. The auxiliary CA RX path is isolated from the system by the isolation of the switch plus the rejection of the diplexer and RX filter. In the cross-connected mode, CA can be implemented using an antenna diplexer in certain applications.

By choosing the diplexer frequencies appropriately, a number of different main/auxiliary CA band combinations can be supported.

Although embodiments discussed herein may be described for auxiliary RX cases, any suitable principles and advantages discussed herein can be used for duplex (TX and RX) operation for single uplink CA.

Embodiments discussed herein have a number of advantages over previous solutions. One or more of the following advantages, among others, can be realized by embodiments of this disclosure. Embodiments discussed herein can be easier to implement than previous solutions. For example, a PAMiD can be implemented with a switch, a diplexer, and a filter to implement one or more additional CA combinations without redesigning the PAMiD to add an additional CA band. Using existing PAMiDs without redesign can speed up the customer's product cycle. Embodiments discussed herein can be more flexible than existing solutions. A number of different band combinations can be supported by the choice of external components with the front end architectures discussed herein. Embodiments discussed herein can work across multiple platforms, for example, because external components are used, the solution is compatible with products from a variety of vendors. In embodiments discussed herein, switching configuration can allow for reduced losses when the auxiliary CA band is not used.

A front end system is an example of a radio frequency electronic system. A front end system can be referred to as a radio frequency front end system. A frontend system can process signals being transmitted and/or received via one or more antennas. For example, a front end system can include one or more switches, one or more filters, one or more low noise amplifiers, one or more power amplifiers, other circuitry, or any suitable combination thereof in one or more signal paths between one or more antennas and a transceiver. Front end systems can include one or more receive paths and one or more transmit paths.

A front end system can include a low noise amplifier (LNA) in a receive path. The LNA can receive a radio frequency (RF) signal from an antenna. The LNA can be used to boost the amplitude of a relatively weak RF signal. Thereafter, the boosted RF signal can be used for a variety of purposes, including, for example, driving a switch, a mixer, and/or a filter in an RF system. LNAs can be included in a variety of applications, such as base stations or mobile devices, to amplify signals of a relatively wide range of radio frequency signals.

A front end system can include a power amplifier in a transmit path. Power amplifiers can be included in front end systems in a wide variety of communications devices to amplify an RF signal for transmission. An RF signal amplified by a power amplifier can be transmitted via an antenna. Example communications devices having power amplifiers include, but are not limited to, mobile phones, tablets, base stations, network access points, laptops, computers, and televisions.

Figure 1B:
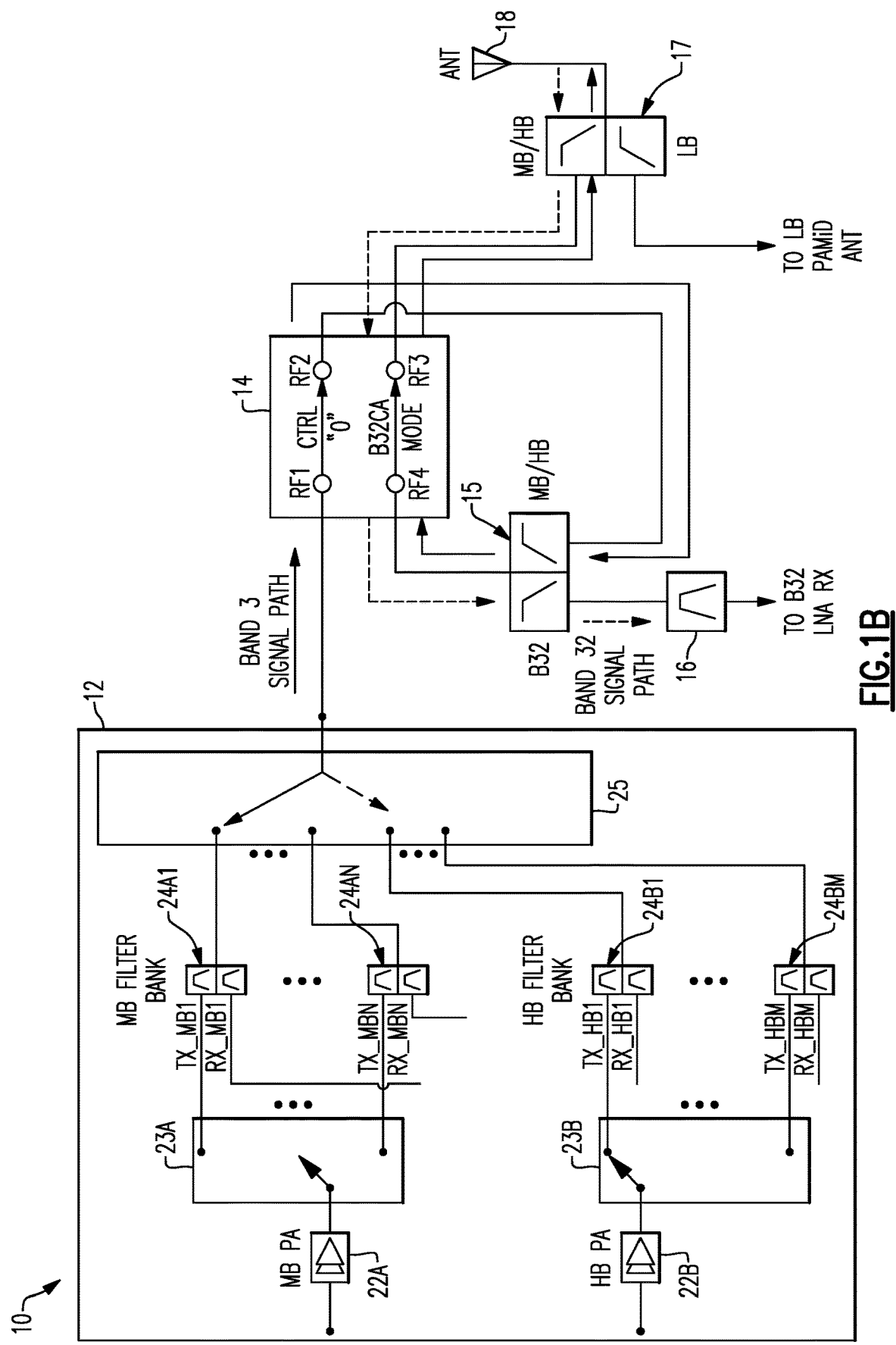
FIG. 1B is a schematic diagram of the radio frequency front end architecture of FIG. 1A in a different mode than illustrated in FIG. 1A.

With reference to FIGS. 1A and 1B, a radio frequency system will be described. FIG. 1A is a schematic diagram of a radio frequency front end architecture according to an embodiment. FIG. 1B is a schematic diagram of the radio frequency front end architecture of FIG. 1A in a different mode than illustrated in FIG. 1A. As illustrated, a radio frequency front end 10 includes a power amplifier module 12, a switch element 14, a first diplexer 15, and antenna path to an antenna 18. The illustrated antenna path includes a second diplexer 17. The radio frequency front end 10 or any of the other front ends discussed herein can be referred to as a front end system. The radio frequency front end 10 is an example of a radio frequency system.

The illustrated power amplifier module 12 includes power amplifiers 22A and 22B, band select switches 23A and 23B, filter banks including duplexers 24A1 to 24AN and 24B1 to 24BM, and an antenna switch 25. The power amplifier module 12 can include a package enclosing the illustrated elements and/or other circuitry. The illustrated power amplifier module 12 includes duplexers 24A1 to 24AN and 24B1 to 24BM and can be referred to as a PAMiD. One or more of the filters of the duplexers 24A1 to 24AN and 24B1 to 24BM can be an acoustic wave filter. An acoustic wave filter includes acoustic wave resonators, such as surface acoustic wave resonators and/or bulk acoustic wave resonators. Any suitable power amplifiers can be included on the power amplifier module 12, such as the illustrated mid band power amplifier 22A and high band power amplifier 22B. Each power amplifier can be selectively electrically coupled to a filter of a filter bank by a band select switch. The filter bank can include duplexers as illustrated and/or dedicated transmit filters and/or dedicated receive filters. An antenna select switch can selectively electrically couple a signal path including a filter and/or duplexer of the filter banks to the antenna port.

The switch element 14 can be any suitable switch element. For instance, the switch element 14 can be a double pole double throw radio frequency switch. The switch element 14 can be a low loss switch. The switch element 14 can be a complementary metal oxide semiconductor (CMOS), silicon-on-insulator (SOI) double-pole, double-throw (DPDT) switch. The switch element 14 can provide high-linearity performance, low insertion loss, and high isolation. There can be low coupling between RF signal paths in the switch element 14. Switching can be controlled by a binary control signal. The illustrated switch element 14 includes ports RF1, RF2, RF3, and RF4.

The first diplexer 15 can be any suitable diplexer. As illustrated, the first diplexer 15 can be a Band 32/mid band/high band diplexer. The first diplexer 15 frequency domain multiplexer includes a common port, a low pass port, and a high pass port. As illustrated, low pass port is coupled to a receive filter 16 and the high pass port is coupled to an output of the antenna switch 25 via the switch element 14. The common port is coupled to the port RF4 of the switch element 14 in the front end 10. While a diplexer is illustrated, any suitable principles and advantages discussed herein can be implemented with other frequency domain multiplexers, such as triplexers.

The illustrated antenna path includes a second diplexer 17. In some applications, an antenna path can alternatively or additionally include one or more filters and/or tuning networks. The antenna 18 illustrated in FIGS. 1A and 1B can be a user equipment antenna, such as an antenna of a mobile phone.

In the radio frequency system illustrated in FIGS. 1A and 1B, the switch element 14 is configurable into at least two modes. The switch element 14 can connect an antenna port of the power amplifier module 12 to the antenna path so as to bypass the first diplexer 15 in the mode shown in FIG. 1A. This can connect a radio frequency signal path of the power amplifier module 12 to the antenna path and bypass the first diplexer 15. By bypassing the first diplexer 15, the loss associated with the first diplexer 15 is not present in the signal path from the antenna port of the power amplifier module 12 to the antenna path. The first diplexer 15 can incur a loss of about 1 dB in certain applications. The radio frequency signal path can be a Band 3 signal path, for example. The switch element 14 can provide relatively high isolation between the Band 3 signal path and the illustrated receive signal path connected to the first diplexer 15. The mode shown in FIG. 1A can be referred to as a normal mode and/or a cross-connected mode.

The switch element 14 can connect an antenna port of the power amplifier module 12 to the antenna path through the first diplexer 15 in the mode shown in FIG. 1B. As illustrated, the antenna port of the power amplifier module 12 can be connected to a mid band/high band port of the first diplexer 15 through the switch element 14 and the common port of the first diplexer 15 can be connected to the antenna path though the switch element 14. A receive path including a receive filter 16 is connected to the antenna path through the first diplexer 15 and the switch element 14 in the mode shown in FIG. 1B. As illustrated, the receive filter 16 is a Band 32 receive filter. Band 32 is a receive only band. The mode shown in FIG. 1B can implement a Band 3/Band 32 carrier aggregation. In the Band 3/Band 32 carrier aggregation, an RF signal received via the antenna 18 can include a Band 3 signal aggregated with a Band 32 signal. The mode shown in FIG. 1B can be referred to as a through connected carrier aggregation mode.

Figure 2A:
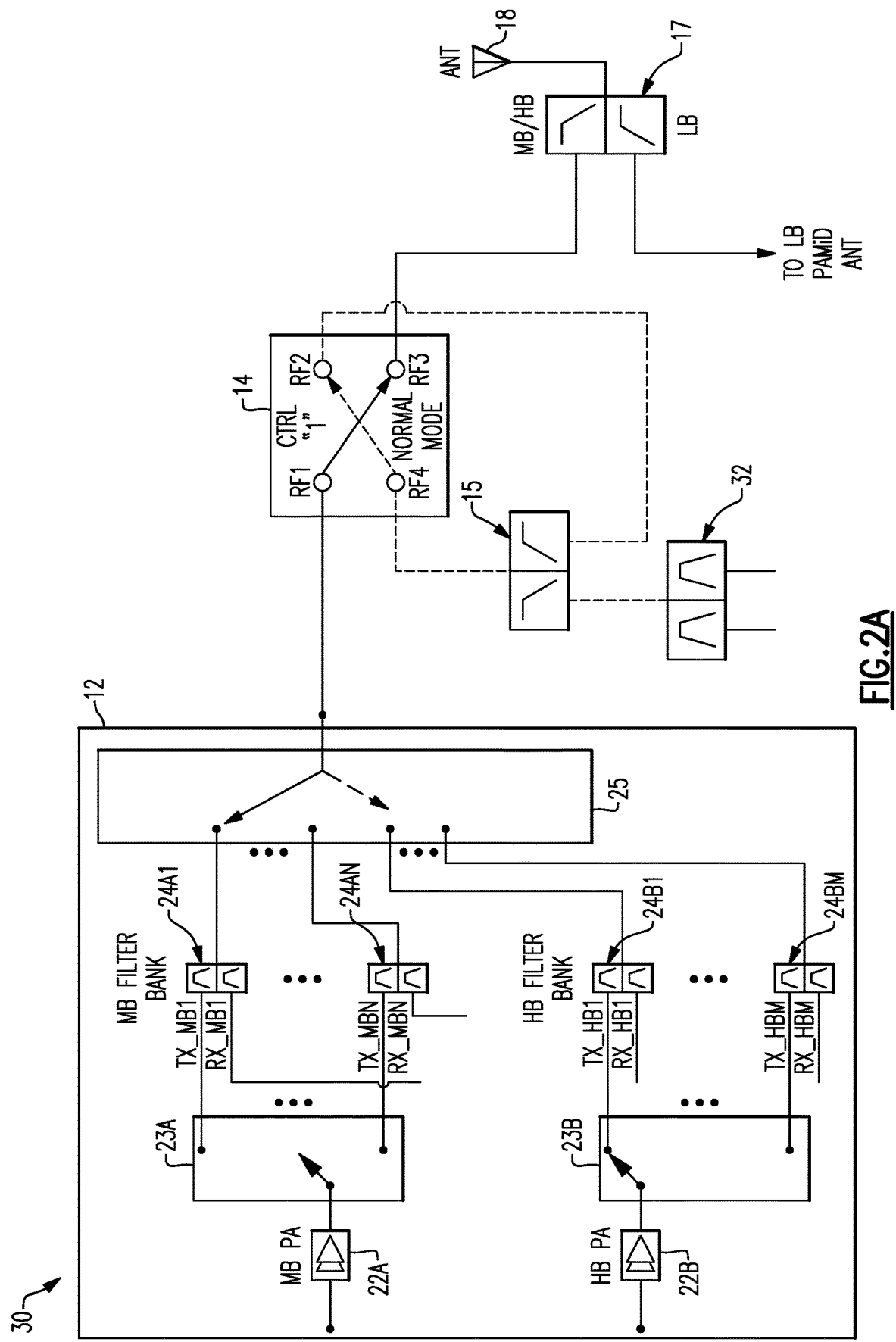
FIG. 2A is a schematic diagram of a radio frequency front end architecture in a first mode according to an embodiment.
Figure 2B:
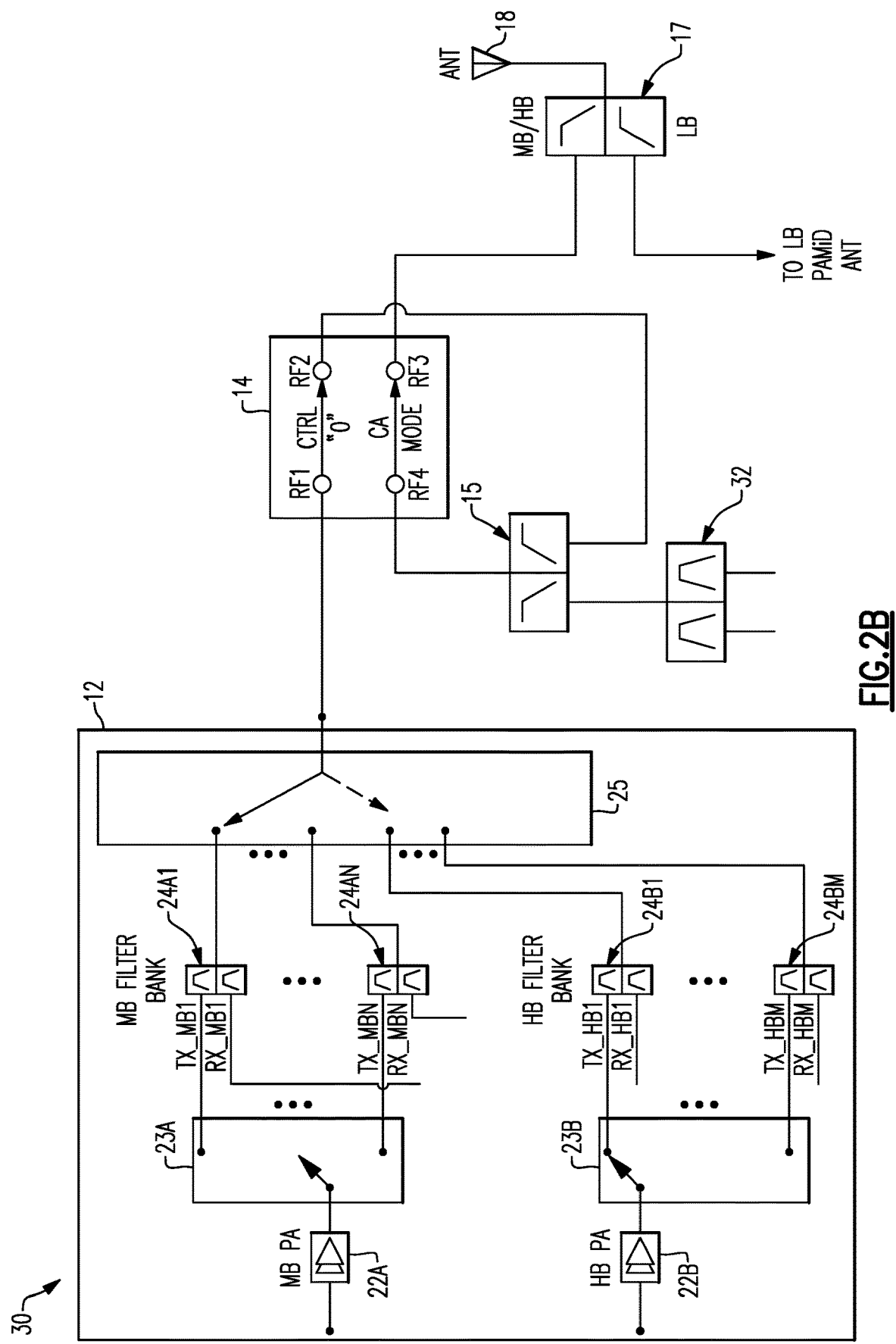
FIG. 2B is a schematic diagram of the radio frequency front end architecture of FIG. 2A in a different mode than illustrated in FIG. 2A.

FIG. 2A is a schematic diagram of a radio frequency front end 20 according to an embodiment. FIG. 2B is a schematic diagram of the radio frequency front end 20 of FIG. 2A in a different mode than illustrated in FIG. 2A. FIGS. 2A and 2B illustrate that carrier aggregations other than the carrier aggregation of FIG. 1B can be implemented. The first diplexer 15 can be any suitable diplexer for implementing a desired carrier aggregation and/or other functionality. The Band 32 receive filter 16 of FIGS. 1A and 1B is replaced with a duplexer 32 in FIGS. 1A and 1B. The diplexer 15 can provide filtering for a receive path and a transmit path associated with a particular band. With the radio frequency front end 20, carrier aggregations can be implemented with an auxiliary CA band that is a transmit and receive band.

Various power amplifier modules can be implemented in accordance with the principles and advantages disclosed herein. A variety of signal paths can be connected to the first diplexer external to a power amplifier module. This can provide additional options for selectively adding an auxiliary CA band. Example embodiments will be described with reference to FIGS. 3A to 4B. Any of the features of these example embodiment can be implemented in combination with any suitable principles and advantages disclosed herein.

Figure 3A:
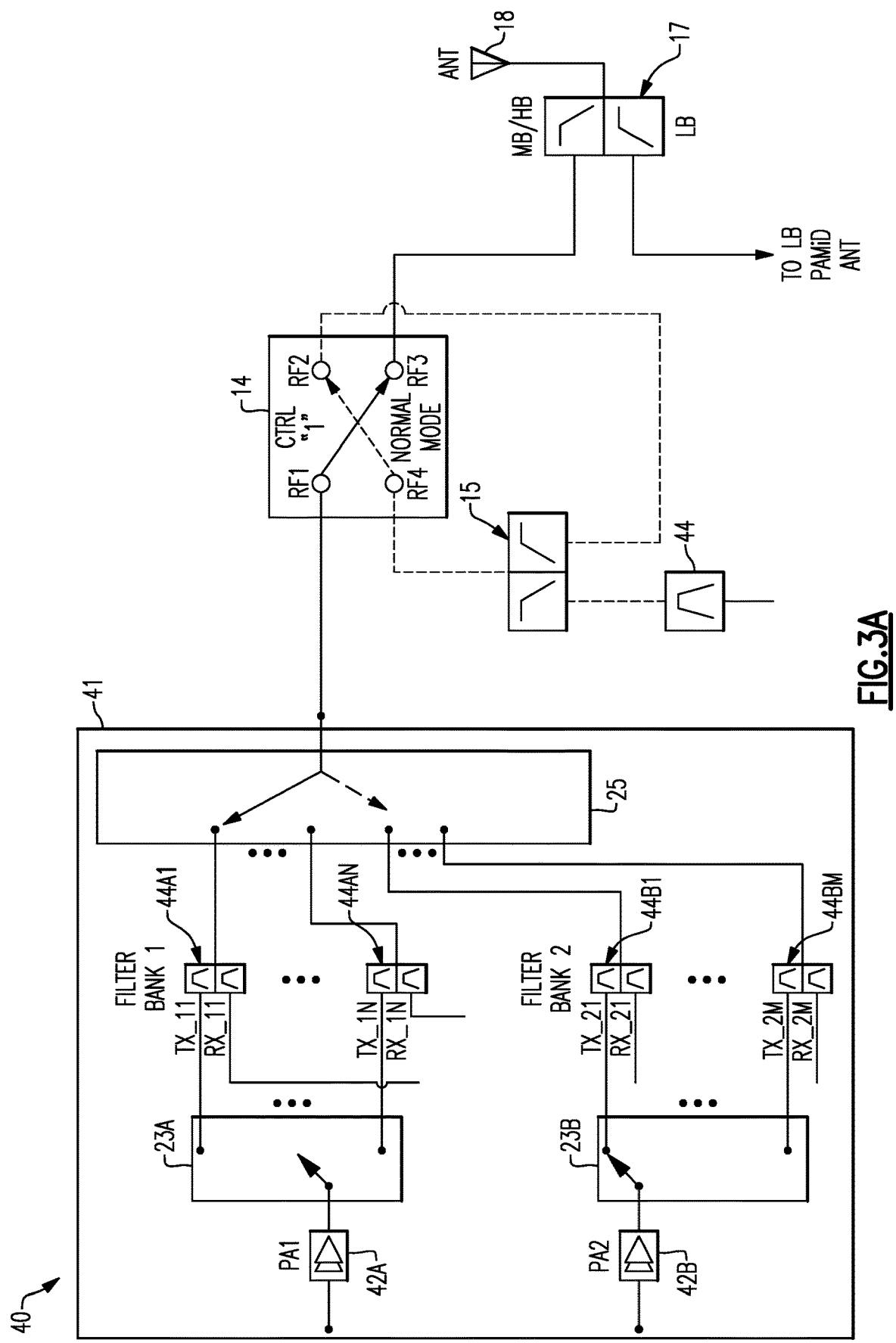
FIG. 3A is a schematic diagram of a radio frequency front end architecture in a first mode according to an embodiment.
Figure 3B:
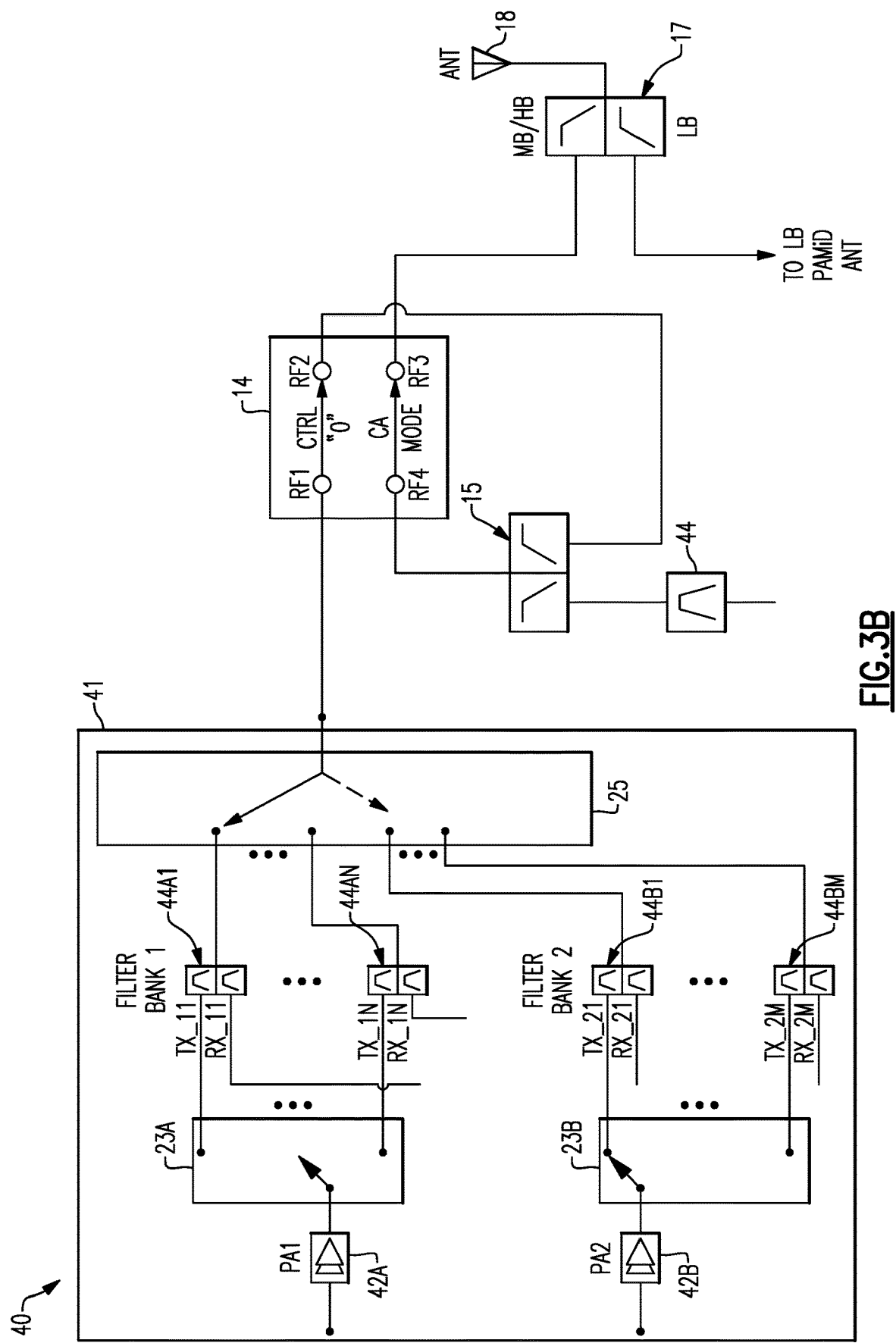
FIG. 3B is a schematic diagram of the radio frequency front end architecture of FIG. 3A in a different mode than illustrated in FIG. 3A.

FIG. 3A is a schematic diagram of a radio frequency front end 30 according to an embodiment. FIG. 3B is a schematic diagram of the radio frequency front end 30 in a different mode than illustrated in FIG. 3A.

The power amplifier module 41 of FIGS. 3A and 3B illustrates that any suitable power amplifiers and filter banks can be implemented in a power amplifier module. Although Figures A to 2B show a power amplifier module 12 with a mid band power amplifier, mid band duplexers, a high band power amplifier, and high band duplexers, other suitable power amplifiers and filters can be implemented in other applications. For example, the power amplifier module 31 includes a first power amplifier 42A and a second power amplifier 42B. These power amplifiers can be associated with one or more of different power levels, different linearity, different frequency bands, the like, or any suitable combination thereof. The duplexers 44A1 to 44An and 44B1 and 44BN can be any suitable duplexers for a particular application.

As shown in FIG. 3B, a receive path including a receive filter 44 is connected to the antenna path through the first diplexer 15 and the switch element 14. The receive path can be isolated from the antenna path in the mode shown in FIG. 3A. FIGS. 3A and 3B illustrate that any suitable receive filter 44 can be included in such a receive path.

Figure 4A:
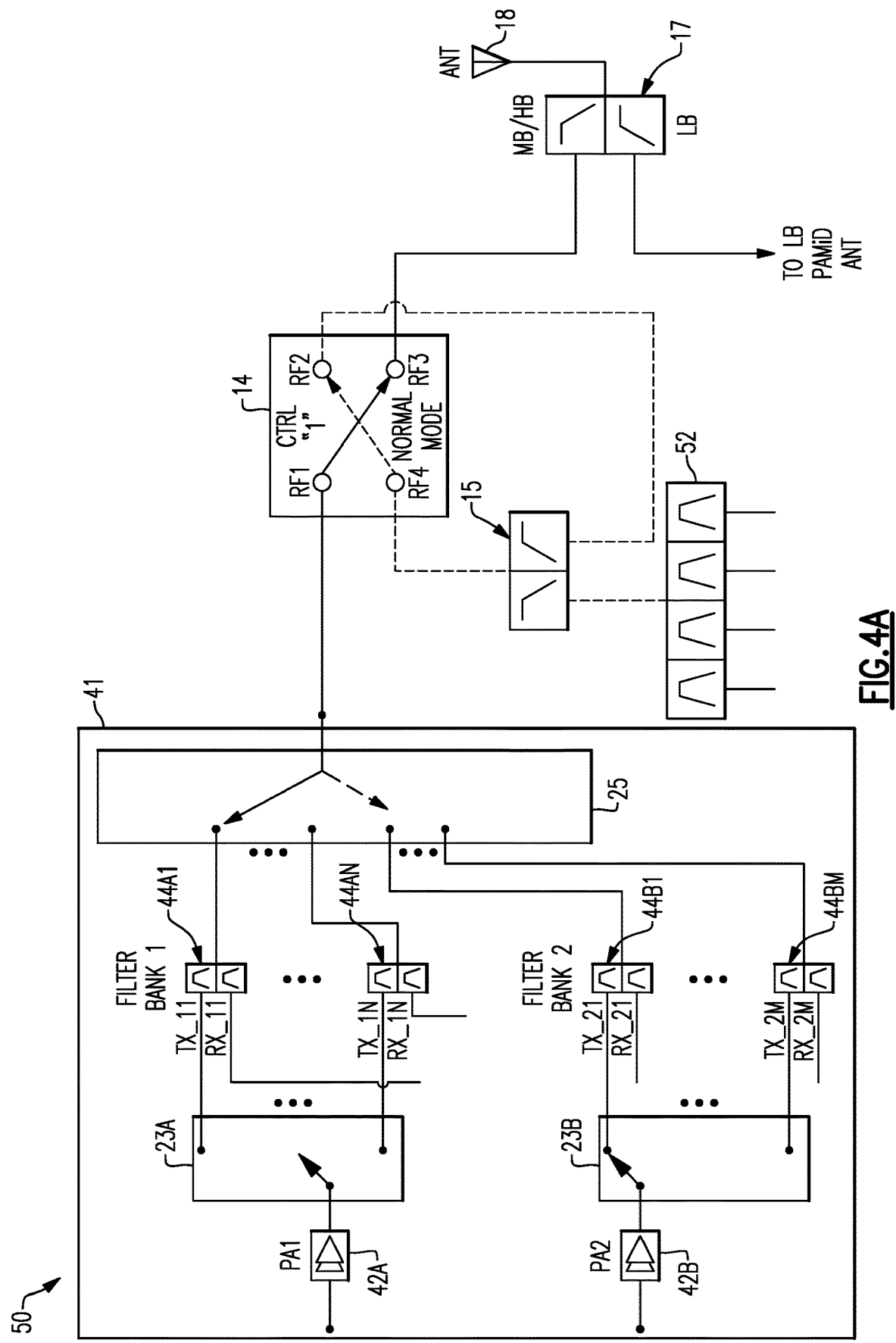
FIG. 4A is a schematic diagram of a radio frequency front end architecture in a first mode according to an embodiment.
Figure 4B:
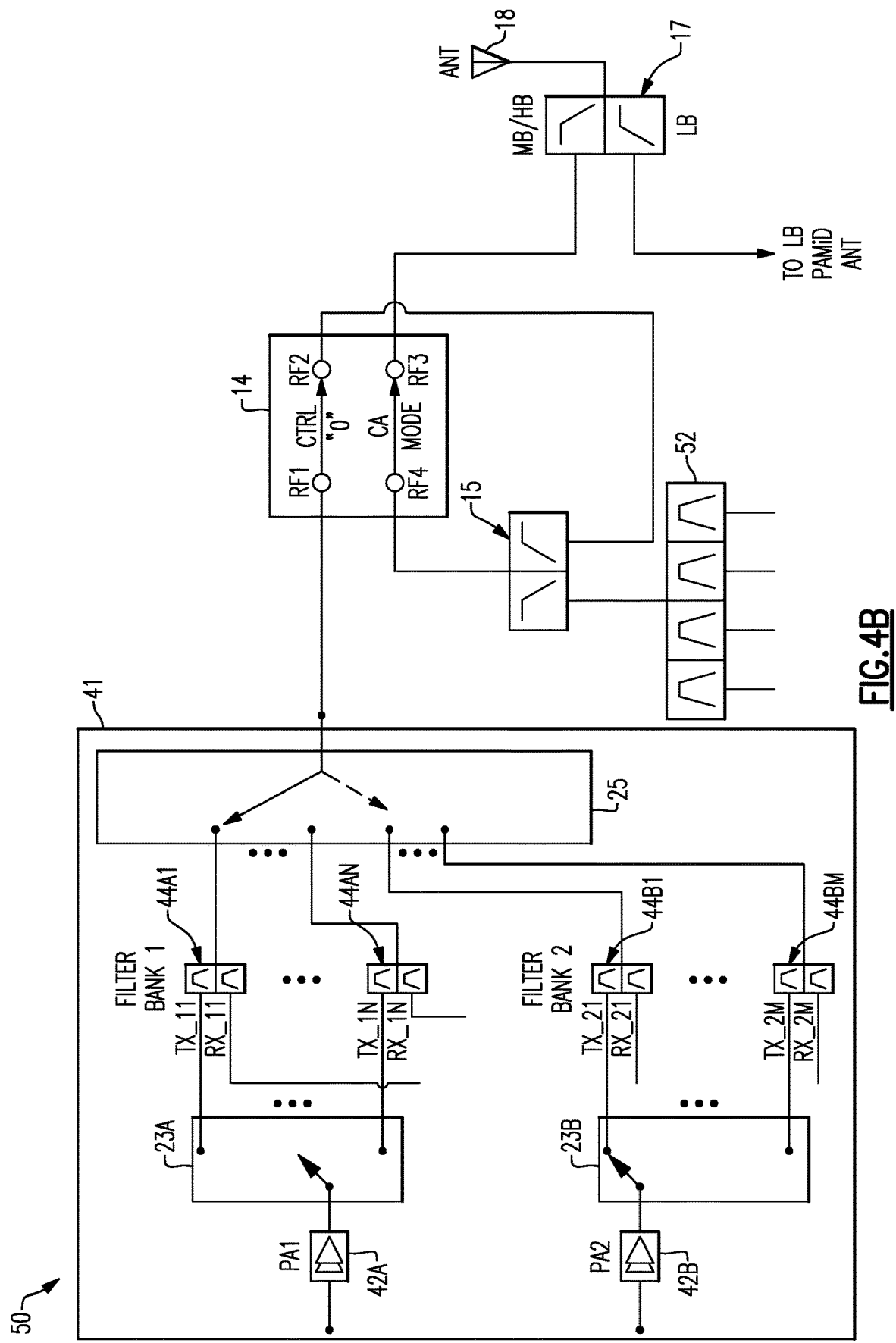
FIG. 4B is a schematic diagram of the radio frequency front end architecture of FIG. 4A in a different mode than illustrated in FIG. 4A.

FIG. 4A is a schematic diagram of a radio frequency front end 40 according to an embodiment. FIG. 4B is a schematic diagram of the radio frequency front end 40 in a different mode than illustrated in FIG. 4A. The radio frequency front end 40 is like the radio frequency front end 40 of FIGS. 3A and 3B except that the radio frequency front end 40 includes a multiplexer 52 coupled to a port of the first diplexer 15 instead of the filter 44. The illustrated multiplexer 52 is a quadplexer. In other applications, any other suitable multiplexer can be implemented, such as a hexaplexer, octoplexer, etc. With the multiplexer 52, additional transmit carrier aggregations and receive carrier aggregations can be implemented in the mode shown in FIG. 4B relative to the mode shown in FIG. 4A.

Figure 6:
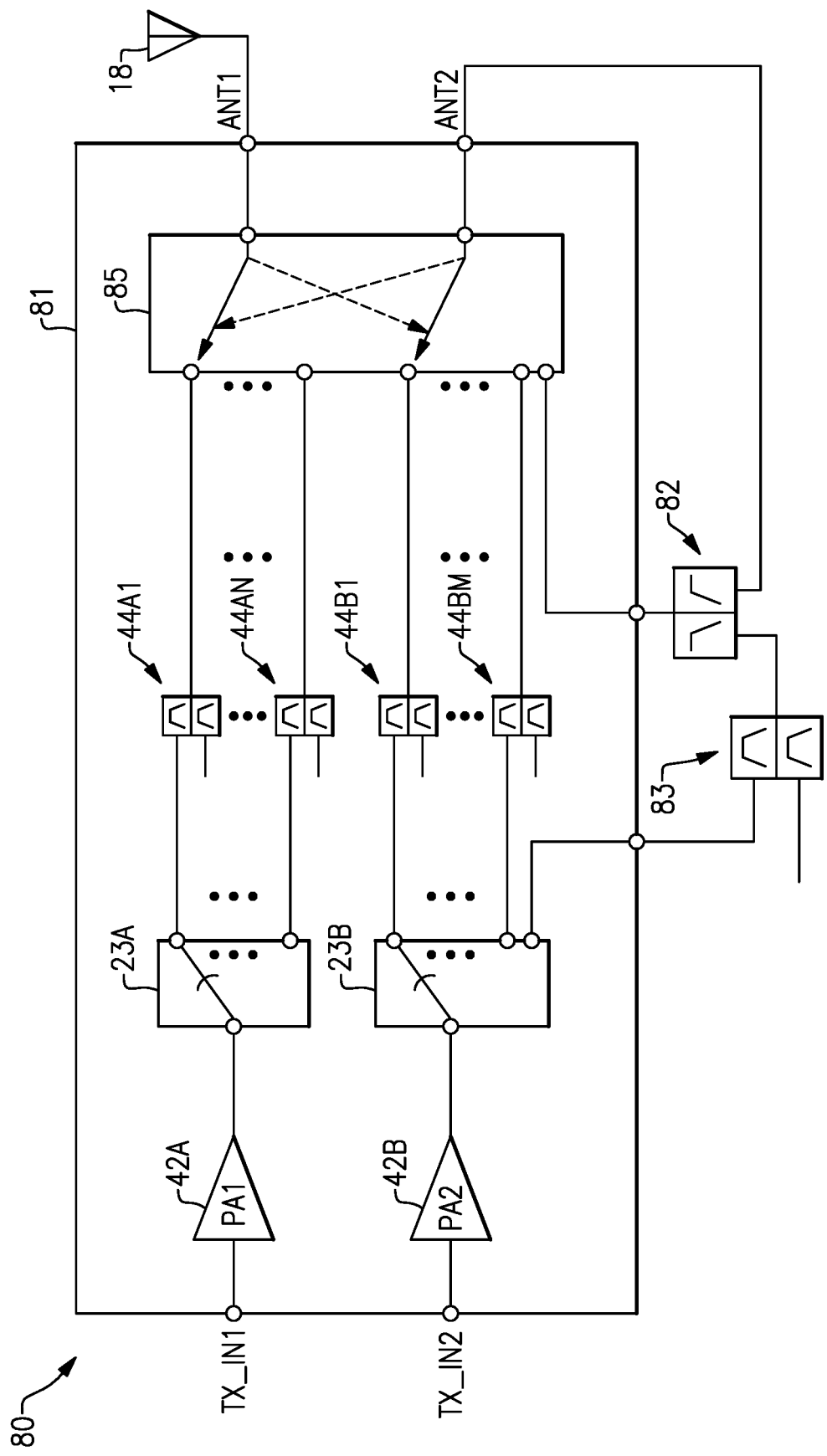
FIG. 6 is a schematic diagram of a radio frequency front end architecture for adding an external carrier aggregation band according to an embodiment.

The embodiments of FIGS. 1A to 4B each include a power amplifier module, a frequency multiplexing circuit external to the power amplifier module, and a switch element external to the power amplifier module to allow an additional CA band to be covered. In certain embodiments, the function of switch element 14 can be implemented by the power amplifier module. FIGS. 5 and 6 illustrate example embodiments in which the functionality of the switch element 14 of FIGS. 1A to 4B is implemented by a switch of a power amplifier module.

FIG. 5 is a schematic diagram of a radio frequency front end architecture for adding an external carrier aggregation band according to another embodiment. As illustrated, a radio frequency front end 60 includes a power amplifier module 61, a frequency multiplexer 62, and a multiplexer 63. The frequency multiplexer 62 and the multiplexer 63 are implemented external to the power amplifier module 61 in the radio frequency front end 60. As illustrated, the frequency multiplexer 62 is a diplexer. A common port of the frequency multiplexer 62 is electrically connected to a transmit/receive port TRX_1 of the power amplifier module 61. The illustrated multiplexer 63 is a quadplexer that includes two transmit filter and two receive filters coupled to each other at a common node. The principles and advantages of the front end architecture illustrated in FIG. 5 can be applied to systems that include different frequency multiplexers (e.g., triplexers) external to a power amplifier module and/or different multiplexers (e.g., duplexers, hexaplexers, octoplexers) external to a power amplifier module.

The illustrated power amplifier module 61 includes power amplifiers 42A and 42B, select switches 63A and 63B, a filter bank that includes multiplexers 64, 65, 67 and filter 66, an antenna switch 68, and a controller 74. Transmit ports TX_IN1 and TX_IN2 provide radio frequency signals for amplification by power amplifiers 42A and 42B, respectively.

The select switch 63A can electrically connect the power amplifier 42A to a selected transmit filter or transmit port of the power amplifier module 61. The select switch 63B can electrically connect the power amplifier 42B to a selected transmit filter or transmit port of the power amplifier module 61.

The filter bank can provide filtering for radio frequency signals from the power amplifiers 42A and 42B. The filter bank can also provide filtering for radio frequency signals received from the antenna 18. The illustrated filter bank includes a hexaplexer 64, a duplexer 65 for Band 7, a transmit filter 66, and a triplexer 67.

The filters of the filter bank are electrically connected between various ports (e.g., RX_1, RX_2, RX_3, and B7_RX) of the power amplifier module 61 and the antenna switch 68.

The antenna switch 68 in connected to antenna ports ANT_1 and ANT_2 of the power amplifier module 61. The antenna switch 68 can implement the functionality of the switch element 14 of FIGS. 1A to 4B. As illustrated, in a first mode, the antenna switch 68 can electrically connect the duplexer 65 to the frequency multiplexer 62 and electrically connect the frequency multiplexer 62 to the antenna 18. This can enable a carrier aggregation with one or more additional carrier aggregation bands. For example, as illustrated, the duplexer 65 is a Band 7 duplexer, the multiplexer 63 is Band 2/Band 66 quadplexer, and the frequency multiplexer 62 is a diplexer that supports a Band 2/Band 7/Band 66 carrier aggregation. As illustrated, the Band 7 duplexer, external diplexer 62, and external quadplexer 63 can together implement a hexaplexer. In a second mode, the frequency multiplexer 62 can be bypassed. The antenna switch 68 can electrically connect a selected input to the antenna 18 and bypass the frequency multiplexer 62. This can avoid the insertion loss of the frequency multiplexer 62 when the frequency multiplexer 62 is not being used for carrier aggregation.

The controller 74 can provide any suitable control functionality for the power amplifier module 61. As illustrated, the controller 74 can be a Mobile Industry Processor Interface (MIPI) controller. The controller 74 can be coupled to SCLK, SDATA, VIO, VBATT ports of the power amplifier module 61 and receive signals from these ports.

FIG. 6 is a schematic diagram of a radio frequency front end 80 for adding an external carrier aggregation band according to an embodiment. As illustrated, the radio frequency front end 80 includes a power amplifier module 81, a frequency multiplexer 82, and a multiplexer 83. The frequency multiplexer 82 and the multiplexer 83 are implemented external to the power amplifier module 81 in the radio frequency front end 80. The illustrated frequency multiplexer 82 is a diplexer. The multiplexer 83 shown in FIG. 6 is a duplexer.

The power amplifier module 81 includes features of the power amplifier module 41 and an antenna switch 85. The antenna switch 85 can implement the functionality of the switch element 14. In a first mode (not illustrated), the antenna switch 85 can electrically connect a duplexer of the duplexers 44A1 to 44AN or 44B1 to 44BM to the frequency multiplexer 82 via port ANT2 and electrically connect the frequency multiplexer 82 to the antenna 18. This can enable a carrier aggregation with one or more additional carrier aggregation bands. A band associated with the multiplexer 83 can be aggregated with a band associated with the duplexer of the power amplifier module 81 that is electrically connected to the multiplexer. In a second mode that is illustrated in FIG. 6, the frequency multiplexer 82 can be bypassed. The antenna switch 85 can electrically connect a selected input to the antenna 18 via port ANT1 and bypass the frequency multiplexer 82. This can avoid the insertion loss of the frequency multiplexer 82 when the frequency multiplexer 82 is not being used for carrier aggregation.

Accordingly, a front end system can include a power amplifier module (e.g., the power amplifier module 61 or 81) that includes an antenna switch (e.g., the antenna switch 68 or 85), a filter external (e.g., a filter of the multiplexer 63 or 83) to the power amplifier module, and a frequency multiplexer (e.g., the frequency multiplexer 62 or 82) external to the power amplifier module. The antenna switch of the power amplifier module can be connected to a first antenna port of the power amplifier module, a second antenna port of the power amplifier module, and a transmit/receive port of the power amplifier module. The frequency multiplexer can include a first port connected to the filter, a second port connected to the second antenna port of the power amplifier module, and a common port connected to the transmit/receive port of the power amplifier module. The antenna switch can connect a signal path of the power amplifier module to the first antenna port in a first state and to the second antenna port in a second state. The second state can be associated with carrier aggregation of a first band associated with the signal path and a second band associated with the filter external to the power amplifier.

Figure 7A:
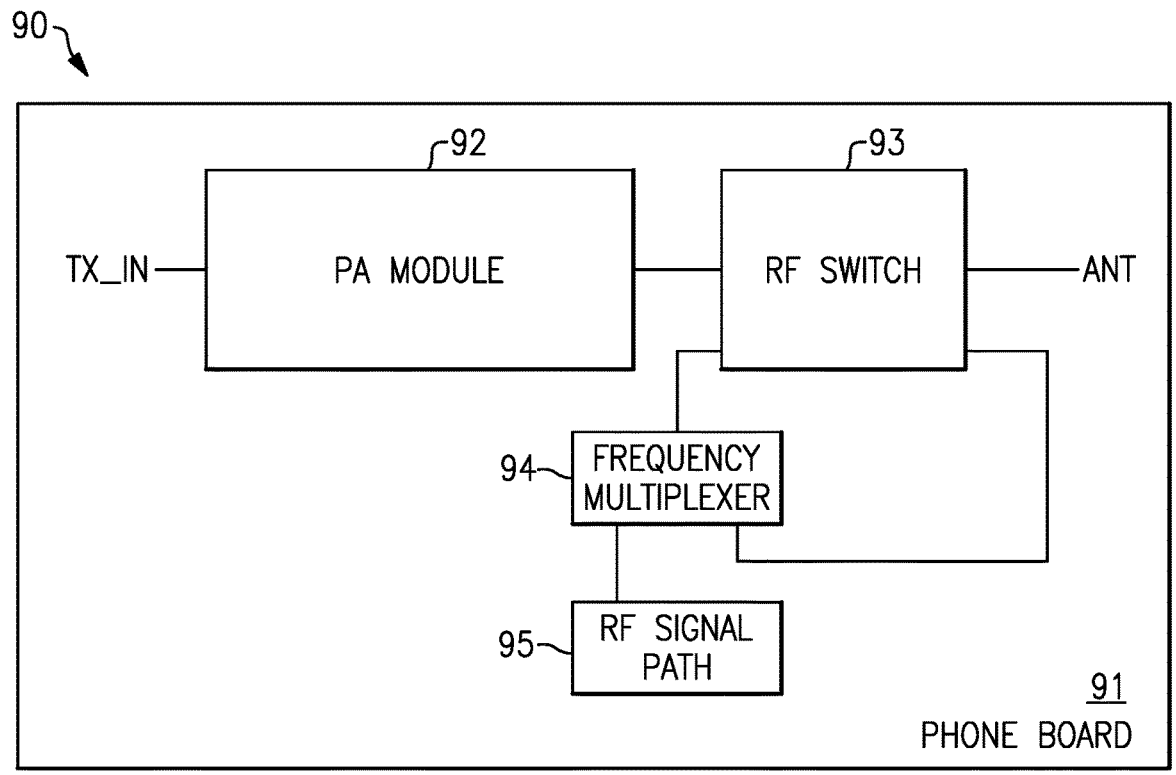
FIG. 7A is a schematic diagram of a phone board assembly that includes a radio frequency front end according to an embodiment.

FIG. 7A is a schematic diagram of a phone board assembly 90 that includes a radio frequency front end on a phone board 91 according to an embodiment. As illustrated, the phone board assembly 90 includes the phone board 91, a power amplifier module 92, a radio frequency switch 93, a frequency multiplexer 94, and radio frequency signal path 95. The radio frequency front end of the phone board assembly 90 can implement any suitable features of the radio frequency front ends of Figures A to 4B. The phone board 91 can be configured for use in a mobile phone. The other illustrated elements in FIG. 7A can be attached to the phone board 91.

The power amplifier module 92 can receive a radio frequency input TX_IN, amplify the radio frequency input, and filter the amplified radio frequency input. The power amplifier module 92 can include any suitable features of the power amplifier modules 12 and/or 41. The output of the power amplifier module 92 can be provided to a RF switch 93.

The RF switch 93 can implement any suitable features of the switch element 14. The RF switch 93 can electrically connect the output of the power amplifier 92 to an antenna port ANT in out mode. The RF switch 93 can electrically connect the output of the power amplifier module 92 to a port of the frequency multiplexer 94 in another mode. Another port of the frequency multiplexer 94 is connected to the radio frequency signal path. The radio frequency signal path 95 can be implemented by any suitable circuitry. For example, the radio frequency signal path 95 can be implemented by another power amplifier module.

Figure 7B:
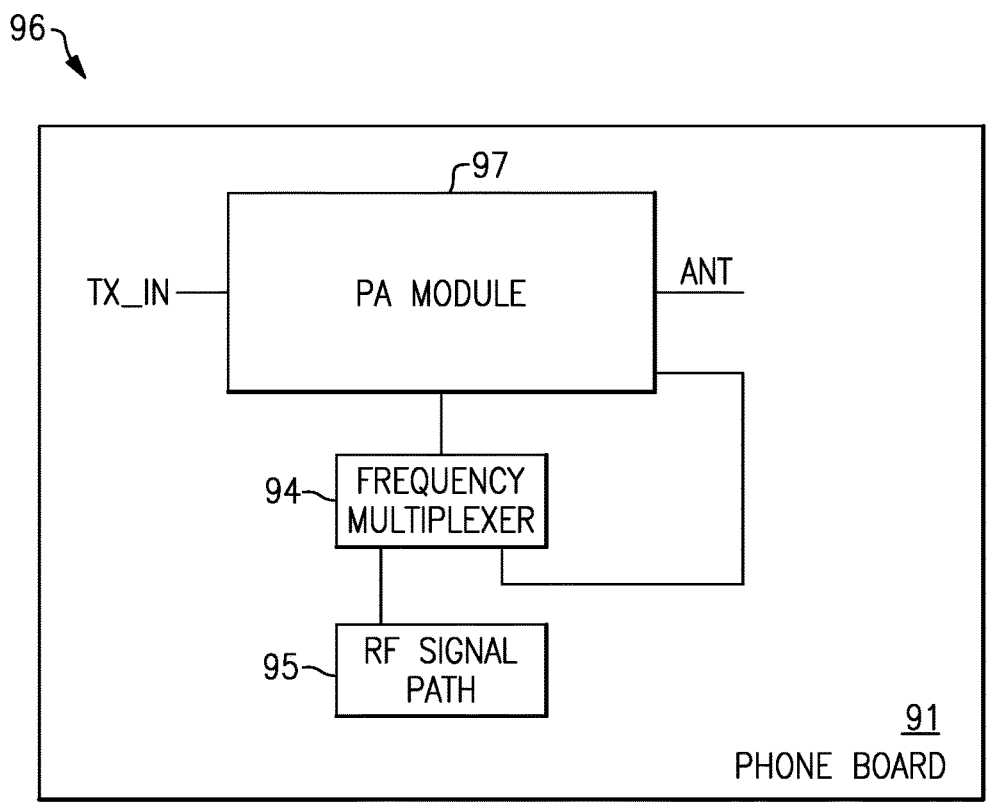
FIG. 7B is a schematic diagram of another phone board assembly that includes a radio frequency front end according to an embodiment.

FIG. 7B is a schematic diagram of another phone board assembly 96 that includes a radio frequency front end according to an embodiment. The radio frequency front end of the phone board assembly 96 can implement any suitable features of the radio frequency front ends of FIGS. 5 to 6. The phone board assembly 96 is like the phone board assembly 90 of FIG. 7A, except that the power amplifier module 97 is included in the phone board assembly 96 in place of the power amplifier module 92 and the RF switch 93 of the phone board assembly 90. The power amplifier module 97 can implement the functionality of both the power amplifier module 92 and the RF switch 93. For example, the power amplifier module 97 can include the switch 68 of FIG. 5 or the switch 85 of FIG. 6.

Figure 8:
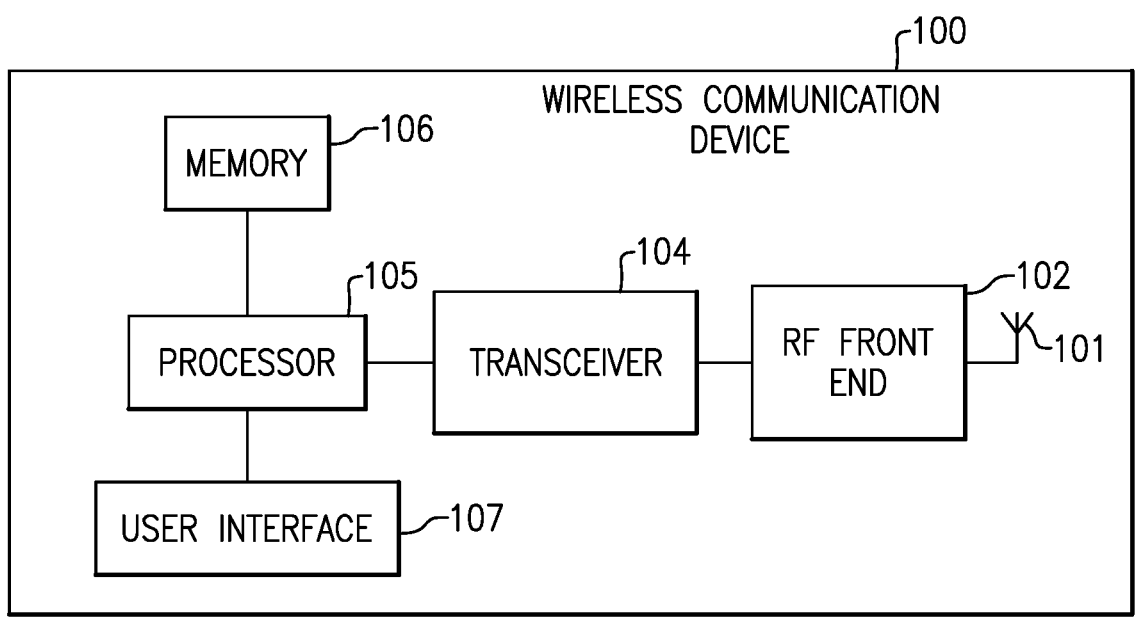
FIG. 8 is a schematic diagram of a wireless communication device that includes a radio frequency front end according to an embodiment.

FIG. 8 is a schematic diagram of a wireless communication device 100 that includes a radio frequency front end 102 according to an embodiment. The wireless communication device 100 can be any suitable wireless communication device. For instance, a wireless communication device 100 can be a mobile phone, such as a smart phone. As illustrated, the wireless communication device 100 includes an antenna 101, an RF front end 102, a transceiver 104, a processor 105, a memory 106, and a user interface 107. The antenna 101 can transmit RF signals provided by the RF front end 102. Such RF signals can include carrier aggregation signals. The antenna 101 can provide received RF signals to the RF front end 102 for processing. Such RF signals can include carrier aggregation signals.

The RF front end 102 can be implemented in accordance with any suitable principles and advantages disclosed herein. For instance, the front end 102 can include any suitable combination of features of the radio frequency front ends of FIGS. 1A to 7B. The RF front end 102 can include one or more power amplifiers, one or more low noise amplifiers, one or more RF switches, receive filters, transmit filters, duplex filters, multiplexers, frequency multiplexing circuits, or any suitable combination thereof. The RF front end 102 can transmit and receive RF signals associated with any suitable communication standards.

The transceiver 104 can provide RF signals to the RF front end 102 for amplification and/or other processing. The transceiver 104 can also process an RF signal provided by a low noise amplifier of the RF front end 102. The transceiver 104 is in communication with the processor 105. The processor 105 can be a baseband processor. The processor 105 can provide any suitable base band processing functions for the wireless communication device 100. The memory 106 can be accessed by the processor 105. The memory 106 can store any suitable data for the wireless communication device 100. The processor 105 is also in communication with the user interface 107. The user interface 107 can be any suitable user interface, such as a display.

The principles and advantages of the embodiments can be implemented in connection with any other systems, apparatus, wireless communication devices, or methods that benefit could from any of the teachings herein. For instance, any of the principles and advantages discussed herein can be implemented in connection with providing other additional carrier aggregation combinations. As another example, any suitable principles and advantages discussed herein can be applied to a system that could benefit from being able to switch in and switch out a frequency domain multiplexer, such as a diplexer, in different modes of operation. Any of the principles and advantages discussed herein can be implemented in association with RF circuits configured to process signals in a range from about 30 kHz to 300 GHz, such as in a range from about 450 MHz to 8.5 GHz. While embodiments may be discussed with reference to power amplifier modules that include one or more power amplifier, any suitable principles and advantages can be applied to any suitable radio frequency modules that include a radio frequency signal path. A radio frequency module can include a radio frequency component enclosed within a package. A radio frequency module with one or more components of a front end can be referred to as a front end module or a radio frequency front end module. A power amplifier module is an example of a front end module.

Aspects of this disclosure can be implemented in various electronic devices. Examples of the electronic devices can include, but are not limited to, consumer electronic products, parts of the consumer electronic products, electronic test equipment, uplink wireless communication devices, personal area network communication devices, etc. Examples of the consumer electronic products can include, but are not limited to, a mobile phone such as a smart phone, a wearable computing device such as a smart watch or an ear piece, a telephone, a television, a computer monitor, a computer, a router, a modem, a hand-held computer, a laptop computer, a tablet computer, a vehicular electronics system such as an automotive electronics system, a microwave, a refrigerator, a stereo system, a DVD player, a CD player, a digital music player such as an MP3 player, a radio, a camcorder, a camera such as a digital camera, a portable memory chip, a washer, a dryer, a washer/dryer, peripheral device, a clock, etc. Further, the electronic devices can include unfinished products.

Unless the context requires otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel methods, apparatus, and systems described herein may be embodied in a variety of other forms. Furthermore, various omissions, substitutions and changes in the form of the methods, apparatus, and systems described herein may be made without departing from the spirit of the disclosure. For example, circuit blocks described herein may be deleted, moved, added, subdivided, combined, and/or modified. Each of these circuit blocks may be implemented in a variety of different ways. The accompanying claims and their equivalents are intended to cover any such forms or modifications as would fall within the scope and spirit of the disclosure.

What is claimed is:

1. A front end system comprising:
a power amplifier module including a power amplifier in a signal path, a first output port, a second output port, a transmit/receive port, a package, and an antenna switch connected to the first output port, the second output port, the transmit/receive port, and the signal path, the antenna switch having different respective ports connected to the transmit/receive port and the signal path, the antenna switch including two poles and a plurality of throws, and the package enclosing the power amplifier and the antenna switch;
a filter external to the package enclosing the power amplifier and the antenna switch;
a frequency domain multiplexer external to the package enclosing the power amplifier and the antenna switch, the frequency domain multiplexer including a first port connected to the filter, a second port connected to the second output port of the power amplifier module, and a common port connected to the transmit/receive port of the power amplifier module; and
an antenna path external to the power amplifier module, the antenna path including a second frequency domain multiplexer electrically connected to the first output port, and the antenna switch configured to selectively electrically couple the signal path to the antenna path.

2. The front end system of claim 1 wherein the antenna switch is configured to electrically connect the signal path to the first output port in a first state and to electrically connect the signal path to the second output port in a second state.

3. The front end system of claim 2 wherein the antenna switch is configured to electrically connect the transmit/receive port to the second output port in the second state.

4. The front end system of claim 2 wherein the first state is associated with a carrier aggregation of a first frequency band associated with the signal path and a second frequency band associated with the filter.

5. The front end system of claim 1 wherein the antenna switch has more throws than poles.

6. The front end system of claim 1 wherein the first port of the frequency domain multiplexer is a high pass port, and the second port of the frequency domain multiplexer is a low pass port.

7. The front end system of claim 1 wherein the first port of the frequency domain multiplexer is a low pass port, and the second port of the frequency domain multiplexer is a high pass port.

8. The front end system of claim 1 wherein the frequency domain multiplexer is a diplexer.

9. The front end system of claim 1 wherein the filter is a receive filter.

10. The front end system of claim 9 wherein the signal path is a Band 3 signal path, the filter is configured to filter a Band 32 signal, and the front end system is configured to support a Band 3/Band 32 carrier aggregation.

11. The front end system of claim 1 wherein the filter is included in a multiplexer that includes a plurality of filters coupled to a common node of the multiplexer, and the plurality of filters includes the filter.

12. The front end system of claim 1 wherein the power amplifier module includes a transmit port, and the filter is coupled between the transmit port and the frequency domain multiplexer.

13. The front end system of claim 1 wherein the power amplifier module includes a second power amplifier that is enclosed with the package, the power amplifier and the second power amplifier are configured to output radio frequency signals in different frequency ranges, and a second signal path from the second power amplifier to the antenna switch includes the filter and the frequency domain multiplexer.

14. The front end system of claim 1 wherein the signal path includes a band select switch and a transmit filter coupled between the power amplifier and the antenna switch.

15. A wireless communication device comprising:
a power amplifier module including a power amplifier in a signal path, a first output port, a second output port, a transmit/receive port, and an antenna switch including two poles and different respective ports connected to each of the first output port, the second output port, the transmit/receive port, and the signal path;
a filter external to the power amplifier module;
a frequency domain multiplexer external to the power amplifier module, the frequency domain multiplexer including a first port connected to the filter, a second port connected to the second output port of the power amplifier module, and a common port connected to the transmit/receive port of the power amplifier module;
an antenna path external to the power amplifier module, the antenna path including a second frequency domain multiplexer; and
an antenna electrically connected to the first output port of the power amplifier module via the second frequency domain multiplexer.

16. The wireless communication device of claim 15 wherein the antenna switch is configured to electrically connect the signal path to the first output port in a first state and to electrically connect the signal path to the second output port in second state.

17. The wireless communication device of claim 16 wherein the first state is associated with a carrier aggregation of a first frequency band associated with the signal path and a second frequency band associated with the filter.

18. The wireless communication device of claim 15 wherein the wireless communication device is a mobile phone.

19. A method of connecting a radio frequency signal path of a power amplifier module to an antenna path external to the power amplifier module, the method comprising:
connecting the radio frequency signal path of the power amplifier module to the antenna path external to the power amplifier module using an antenna switch of the power amplifier module such that a radio frequency signal from a power amplifier propagates (i) through the antenna switch to a frequency domain multiplexer that is external to the power amplifier module via a second output port of the power amplifier module and (ii) through the frequency domain multiplexer and the antenna switch to the antenna path via a first output port of the power amplifier module, said connecting causing the radio frequency signal to propagate through the antenna switch two times between the power amplifier and the antenna path, and the antenna switch including two poles and a plurality of throws; and
changing a state of the antenna switch such that the radio frequency signal path is connected to the antenna path via the first output port of the power amplifier module and bypasses the frequency domain multiplexer.

20. The method of claim 19 wherein said connecting supports a carrier aggregation signal that includes a first carrier associated with the radio frequency signal path and a second carrier associated with a filter external to the power amplifier module that is connected to the frequency domain multiplexer.

* * * * *